United States Patent
Chan

(10) Patent No.: US 8,107,619 B2
(45) Date of Patent: Jan. 31, 2012

(54) METHOD, SYSTEM AND APPARATUS FOR CONTROLLING A NETWORK INTERFACE DEVICE

(75) Inventor: Frank Siu Hong Chan, Scarborough (CA)

(73) Assignee: BCE Inc., Verdun, Quebec (CA)

( * ) Notice: Subject to any disclaimer, the term of this patent is extended or adjusted under 35 U.S.C. 154(b) by 509 days.

(21) Appl. No.: 11/997,223

(22) PCT Filed: Dec. 20, 2006

(86) PCT No.: PCT/CA2006/002088
§ 371 (c)(1),
(2), (4) Date: Jan. 29, 2008

(87) PCT Pub. No.: WO2008/028270
PCT Pub. Date: Mar. 13, 2008

(65) Prior Publication Data
US 2010/0296647 A1    Nov. 25, 2010

(51) Int. Cl.
*H04M 9/08* (2006.01)
(52) U.S. Cl. ............... 379/413.02; 379/413.04
(58) Field of Classification Search ............ 379/413.02, 379/413.04
See application file for complete search history.

(56) References Cited

U.S. PATENT DOCUMENTS

| | | | |
|---|---|---|---|
| 6,181,775 B1 | 1/2001 | Bella | |
| 6,961,335 B1* | 11/2005 | Millet et al. | 370/356 |
| 6,999,505 B2 | 2/2006 | Yokoo et al. | |
| 7,027,594 B2 | 4/2006 | Casey et al. | |
| 7,200,206 B1* | 4/2007 | Carbain | 379/27.01 |
| 7,453,989 B1* | 11/2008 | Carbain | 379/27.01 |
| 2003/0005069 A1 | 1/2003 | DePaul et al. | |
| 2003/0226149 A1 | 12/2003 | Chun et al. | |
| 2007/0127713 A1* | 6/2007 | Schley-May et al. | 379/413.02 |

FOREIGN PATENT DOCUMENTS
WO  PCT/CA2006/002088    6/2007

OTHER PUBLICATIONS

Office Action mailed on Oct. 5, 2009 in connection with Canadian Patent Application 2,559,422.

* cited by examiner

*Primary Examiner* — Creighton Smith

(57) ABSTRACT

According to embodiments of the present invention, a method, system and apparatus for controlling a network interface device is disclosed, the network interface device for enabling communication between a communications network and at least one customer device. A condition of the network interface device is determined. In response to the condition of the network interface device qualifying as a reset condition, a trigger is generated. The trigger is released to a power controller, the trigger having an ability to cause the power controller to cycle power to the network interface device.

58 Claims, 16 Drawing Sheets

METHOD, SYSTEM AND APPARATUS FOR CONTROLLING A NETWORK INTERFACE DEVICE

FIELD OF THE INVENTION

This invention relates generally to network interface devices and, more specifically to a method, system and apparatus for controlling a network interface device.

BACKGROUND OF THE INVENTION

A network interface device (NID) is commonly used as a demarcation point between a service provider's communication network and a customer's inside wiring. In its simplest form, a NID is a connection device, which connects wiring for the service provider's communication network to the customer's inside wiring. Generally mounted to the outside wall of a customer's house, the NID provides a physical termination point for the service provider's communication network, isolates the customer's inside wiring (and subtending devices), and serves as a physical access point for technicians dispatched to the customer's house during truck rolls.

In order to minimize the equipment to be installed inside the customer's house when rolling out a new service, some service providers are introducing NIDs with functions beyond physical connectivity. These advanced NIDs may include devices such as a POTS (plain old telephone system) splitter, a gateway (for example a modem), a router, and various connectors. A power supply originating from inside the customer's house may be used to power some of the aforesaid devices. In this architecture, the gateway in the NID, which resides outside the customer's house, is connected to a local area network (LAN) inside the customer's house, thereby providing the customer with access to the service provider's communication network, for internet devices such as computers, VoIP (voice over internet protocol) devices, or IPTV set top boxes. In addition having the gateway external to the customer's house allows a service provider to change or service the equipment without disturbing the customer.

However, problems may arise with the NID, so as to affect the connectivity of the customer's LAN to the service provider's communication network. As a result, certain devices within the NID, or indeed the NID itself, may require resetting. In one approach, the service provider dispatches a technician on a truck roll so that the NID, which is typically located outside the customer's home, can be reset. As the need to reset the NID and/or the gateway or other devices forming part of the NID can be a common occurrence, the frequent truck rolls associated with such an approach represents a significant cost to the service provider.

In another approach, the service provider may instruct the customer to reset the NID himself, by visiting the NID on the outside of the customer's home. However, this is not an ideal solution as the customer may be uncomfortable with the prospect of having to interact with a device that belongs to the service provider, and further may hesitate to go outside in inclement weather. In addition, the customer may feel inconvenienced by the service provider for having to perform a function that is in effect the responsibility of the service provider.

There remains a need therefore for an improved method, system and apparatus for controlling a network interface device.

SUMMARY OF THE INVENTION

A first broad aspect of the invention seeks to provide a network interface controller. The network interface controller comprises an interface configured to communicate with a network interface device, the network interface device for enabling communication between a communications network and at least one customer device. The network interface controller further comprises a processing module in communication with the interface, the processing module configured to determine a condition of the network interface device, to generate a trigger responsive to the condition of the network interface device qualifying as a reset condition and to release the trigger to a power controller to cause cycling of power to the network interface device.

In some embodiments of the present invention, the interface is further configured to convey data between the communications network and the at least one customer device.

In further embodiments of the present invention, the processing module is further configured to access data being exchanged between the network interface device and the at least one customer device. In other embodiments, the processing module is configured to determine the condition of the network interface device by processing said data. In yet further embodiments, the condition of the network interface device qualifies as a reset condition when said data contains one or more predetermined errors. In yet further embodiments, the one or more predetermined errors comprises the network interface device failing to transmit said data within a pre-determined time period. In other embodiments the condition of the network interface device qualifies as a reset condition when an error rate of said data is above a threshold error rate.

In some embodiments of the present invention, the processing module is further configured to effect the transmission of a data request to the network interface device via the interface, and the condition of the network interface qualifies as a reset condition if a failure to receive a data request response in response to the data request is detected.

In yet further embodiments of the present invention, the processing module is further configured to effect the transmission of a data request to the network interface device via the interface, and to determine the condition of the network interface device the processing module is further configured to process a data request response received in response to the data request. In some embodiments, the condition of the network interface device qualifies as a reset condition if the received data request response indicates that the network interface device requires resetting.

In some embodiments of the present invention, to determine the condition of the network interface device the processing module is configured to measure a data exchange rate between the network interface device and the at least one customer device and to determine the condition of the network interface device based on the data exchange rate. In other embodiments, the condition of the network interface device qualifies as a reset condition if the data exchange rate is lower than a predetermined threshold data exchange rate.

In yet further embodiments of the present invention, to determine the condition of the network interface device the processing module is configured to determine the condition of the network interface device periodically.

In some embodiments of the present invention, the condition of the network interface device qualifies as a reset condition when the current time corresponds to a preset time.

In some embodiments of the present invention, the condition of the network interface device qualifies as a reset condition when a predetermined time period has elapsed since the network interface device was last reset.

In yet further embodiments the an apparatus is provided, the apparatus comprising the network interface controller and the power controller, the power controller configured to effect said cycling of power to the network interface device, in response to receipt of the trigger from the processing module. In some embodiments, the apparatus further comprises a power supply configured to supply said power. In other embodiments, to effect said cycling of power, the power controller is further configured to switch off power supplied to the network interface device and subsequently switch on power supplied to the network interface device. In yet other embodiments, the power controller is further configured to delay the switch on of power supplied to the network interface device for a defined time period. In yet other embodiments, the defined time period is configurable by a user. In some embodiments, to effect said cycling of power, the power controller is configured to switch off power supplied to at least one component of the network interface device and subsequently switch on power supplied to the at least one component of the network interface device. In yet other embodiments, the at least one component of the network interface device comprises at least one of a memory component, a logic processing component and a communications component.

In some embodiments of the present invention, the interface comprises a portion implemented as at least one of a wireless interface and a wired interface, wherein the wireless interface includes at least one of a WiFi interface and a WiMax interface, and wherein the wired interface includes at least one of a cable interface, a coaxial interface, a power line control interface, an Ethernet interface and a DSL interface.

In yet further embodiments of the present invention, the interface is further configured to communicate with the power controller and the processing module is further configured to release the trigger to the power controller via the interface.

In some embodiments of the present invention, the interface is further configured to provide power to the network interface device from a power supply.

In a second broad aspect of the present invention, a method for controlling a network interface device is provided, the network interface device for enabling communication between a communications network and at least one customer device. The method comprises determining a condition of the network interface device. The method further comprises generating a trigger responsive to determining that the condition of the network interface device qualifies as a reset condition. The method further comprises releasing the trigger to a power controller, the trigger having an ability to cause the power controller to cycle power to the network interface device.

In some embodiments of the present invention, the method further comprises receiving the trigger and cycling the power supplied to the network interface device in response to receiving the trigger.

In yet other embodiments, determining a condition of the network interface device comprises processing data being exchanged between the network interface device and the at least one customer device. In some embodiments, the condition of the network interface device qualifies as a reset condition when said data contains one or more predetermined errors. In further embodiments, the one or more predetermined errors comprises the network interface device failing to transmit said data within a pre-determined time period. In yet further embodiments, the condition of the network interface device qualifies as a reset condition when an error rate of said data is above a threshold error rate.

In other embodiments of the present invention, determining that the condition of the network interface device qualifies as a reset condition comprises transmitting a data request to the network interface device and detecting a failure to receive a response to the transmitting of the data request to the network interface device.

In yet other embodiments of the present invention, determining a condition of the network interface device comprises transmitting a data request to the network interface device, receiving a data request response in response to the transmitting of a data request and processing the data request response. In some embodiments, the condition of the network interface device qualifies as a reset condition when the data request response indicates that the network interface device requires resetting.

In yet other embodiments of the present invention, determining a condition of the network interface device comprises receiving a data request response and processing the data request response.

In yet further embodiments of the present invention, determining a condition of the network interface device comprises measuring a data exchange rate between the network interface device and the least one customer device. In some the condition of the network interface device qualifies as a reset condition if the data exchange rate is lower than a predetermined threshold data exchange rate.

In yet other embodiments, determining a condition of the network interface device comprises determining the condition of the network interface device periodically.

In yet further embodiments of the present invention, the condition of the network interface device qualifies as a reset condition when the current time corresponds to a preset time.

In some embodiments of the present invention, the condition of the network interface device qualifies as a reset condition when a predetermined time period has elapsed since the network interface device was last reset.

In yet other embodiments of the present invention, cycling power supplied to the network interface device comprises switching off power supplied to the network interface device and subsequently switching on power supplied to the network interface device. In some embodiments, the switching on power supplied to the network interface device is delayed by a defined time period subsequent to the switching off power supplied to the network interface device.

In some embodiments of the present invention, cycling power supplied to the network interface device comprises switching off power supplied to at least one component of the network interface device and subsequently switching on power supplied to the at least one component of the network interface device. In some embodiments, switching on power supplied to the network interface device is delayed by a defined time period subsequent to the switching off power supplied to the network interface device. In yet other embodiments, the at least one component of the network interface device comprises at least one of a memory component, a logic processing component and a communications component.

A third broad aspect of the invention seeks to provide a system, the system comprising an interface configured to communicate with a network interface device, the network interface device for enabling communication between a communications network and at least one customer device. The system further comprises a processing module in communication with the interface, the processing module configured to determine a condition of the network interface device, the processing module further configured to generate a trigger responsive to the condition of the network interface device qualifying as a reset condition. The system further comprises a power controller in communication with the processing module, the power controller configured to cycle power supplied to the network interface device, in response to the trigger.

In some embodiments of the present invention, the system further comprises a power supply, the power supply configured to supply the power.

In some embodiments of the present invention, the power controller is integrated into the network interface device.

In some embodiments of the present invention, the system further comprises a network interface controller, the network interface controller comprising the interface and the processing module. In some embodiments, the power controller is integrated into the network interface controller. In yet other embodiments, the network interface controller is integrated into the network interface device. In yet other embodiments, the power controller and the power supply are integrated into the network interface controller. In yet other embodiments, the power controller and the network interface controller are integrated into the network interface device. In yet other embodiments, the network interface controller is integrated into the at least one customer device.

A fourth broad aspect of the invention seeks to provide a power controller for controlling power to a network interface device, the power controller configured to initiate cycling of power to the network interface device in response to receiving a trigger generated in response to a condition of the network interface device qualifying as a reset condition.

In some embodiments, the invention seeks to provide a system comprising the power controller and a processing module, the processing module configured to determine a condition of the network interface device, the processing module further configured to generate a trigger responsive to the condition of the network interface device qualifies as a reset condition. In some embodiments, the condition of the network interface device qualifies as a reset condition when the current time corresponds to a preset time. In yet further embodiments, the condition of the network interface device qualifies as a reset condition when a predetermined time period has elapsed since the network interface device was last reset.

BRIEF DESCRIPTIONS OF THE DRAWINGS

Embodiments of the present invention are described with reference to the following figures, in which.

DETAILED DESCRIPTION OF THE EMBODIMENTS

Figure 1:
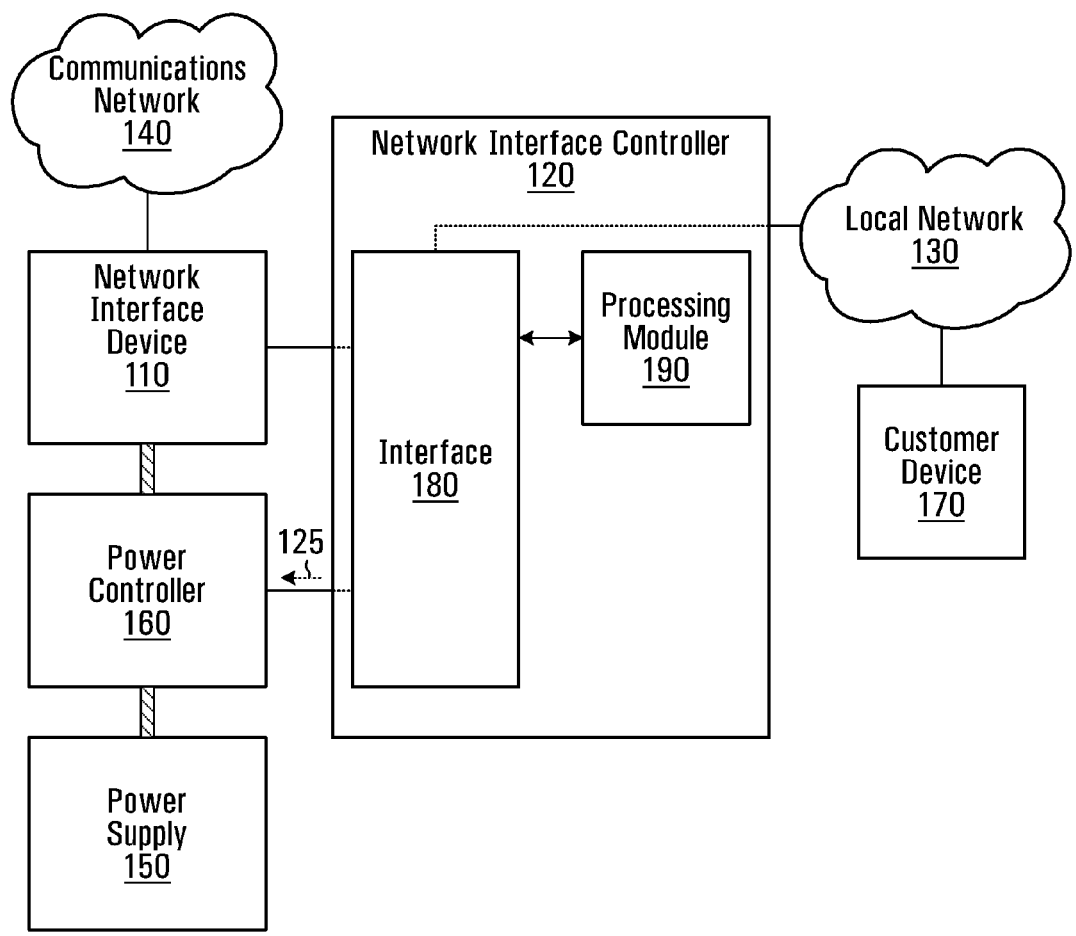
FIG. 1 depicts a system for controlling power to a NID, according to an embodiment of the present invention.

FIG. 1 depicts a system, according to one embodiment of the present invention, for controlling power to a network interface device (NID) 110. The NID 110 is in communication with a network interface controller (NIC) 120, which communicates with a power controller 160, and is in further communication with a communication network 140. The NIC 120 is in communication with at least one customer device 170 via at least one local network 130. However, in some embodiments, the NIC 120 is in direct communication with the at least one customer device 170, for example directly connected to the customer device 170. The NID 110 is powered by a power supply 150, via the power controller 160. In FIG. 1, and subsequent figures, connections over which power may be conveyed are depicted as thick hatched lines, while connections over which data may be conveyed are depicted as solid lines.

The NID 110 may be any device which enables communication between the communications network 140 and the at least one customer device 170. The NID 110 will in general require power to perform this function. In one embodiment, the NID 110 may be located external to, but proximate, a customer premises, for example mounted to the outside of a structure, such as a house or a business. However, in other embodiments, the NID 110, may be located remote from the customer premises, such as at a central office or central provisioning point. In yet other embodiments the NID 110 may be located within a customer premises.

The NID 110 may include various apparatus and/or subcomponents. In some embodiments, the apparatus and/or subcomponents may assist in enabling communication between the communications network 140 and the at least one customer device 170. In some embodiments, the subcomponents may include at least a memory component, a logic processing component and/or a communications component. Within these embodiments, the subcomponents may be integrated into a single module within the NID 110. However in other embodiments, these subcomponents may be distributed among various modules located within the NID 110; such modules may include a modem, a management module, and various connectors for connecting relevant cabling. In some embodiments, the NID 110 may also include a splitter for separating data destined for a first type of customer device, from data destined for a second type of customer device. In a non-limiting embodiment, the splitter may be a POTS splitter. This is particularly beneficial in situations where the communication network 140 is configured to communicate data for both (i) packet-based customer device, such as a personal computer; and (ii) analog customer device, such as a POTS telephone.

The communications network 140 may include any network that is configured to exchange data between the at least one customer device 170 and devices in communication with the communication network 140. Specific non-limiting examples of the communication network 140 include the public switched telephone network (PSTN), and networks enabled to transmit packet based communications, such as the public internet, or an intranet such as a LAN or a WAN (wide area network), or combinations thereof. Such networks may include fibre based networks, WiMax networks, WiFi networks, CDMA (code division multiple access) networks, GSM (global system for mobile communication) networks, and networks enabled to transmit voice over internet protocol (VoIP) communications. In one specific non-limiting embodiment, the communications network 140 is a DSL (digital subscriber loop) network, which may be further configured to communicate POTS telephone calls.

The local network 130 may include any network that is configured to exchange data between devices in communication with the communications network 140, and the at least one customer device 170. Specific non-limiting examples of the local network 130 may include an ethernet network (which may include a router), a WiFi network, and a power line controller network.

The power supply 150 may be any device suitable for supplying power to the NID 110. The power supply 150 may be dedicated to supplying power to the NID 110, but may also supply power to other devices, such as the NIC 120, or the at least one customer device 170. In one embodiment, the power supply 150 may be located inside the customer premises, however in further embodiments the power supply 150 may be located external to the customer premises. In further embodiments the power supply may be connected to the internal electrical power wiring of the customer premises.

The NIC 120 may be any device which is configured to determine a condition of the NID 110. The NIC 120 is further configured to generate a trigger 125, in response to the condition of the NID 110 qualifying as a "reset condition". The trigger 125 has the effect of causing the power controller 160 to cycle power to the NID 110. To this end, the NIC 120 is further configured to release the trigger 125 to the power controller 160. In one embodiment, the NIC 120 may be located internal to a customer premises, or external to, but proximate, a customer premises, for example mounted to the outside of a structure, such as a house or a business. However in other embodiments the NIC 120, but may be located remote from the customer premises, such as at a central office or central provisioning point.

Continuing to refer to FIG. 1, in a non-limiting embodiment, the NIC 120 comprises an interface 180 that is configured to communicate with the NID 110. A processing module 190, in communication with the interface 180, is configured to determine the condition of the NID 110, and is further configured to generate the trigger 125 responsive to the condition of the NID 110 qualifying as a reset condition. The processing module 190 is configured to release the trigger 125 to the power controller 160. In some embodiments, the processing module 190 may release the trigger 125 to the power controller 160 via the interface 180. Within these embodiments, the interface 180 may be further configured to communicate with power controller 160. Other devices may be incorporated into NIC 120, for example power controller 160 and/or power supply 150, as will be discussed below. Yet other devices which may be incorporated into NIC 120 will occur to those of skill in the art, and are within the scope of the present invention.

In some embodiments, the interface 180 may comprise a single connector. In other embodiments the interface 180 may comprise a plurality of connectors, distinct from one another. For example the interface 180 may comprise a connector configured to communicate with the NID 110, a connector configured to communicate with the power controller 160, and a connector configured to communicate with the at least one local network 130 and/or the at least one customer device 170. In further embodiments, described below, the interface 180 may further comprise a connector for communication with the power supply 150.

Figure 2:
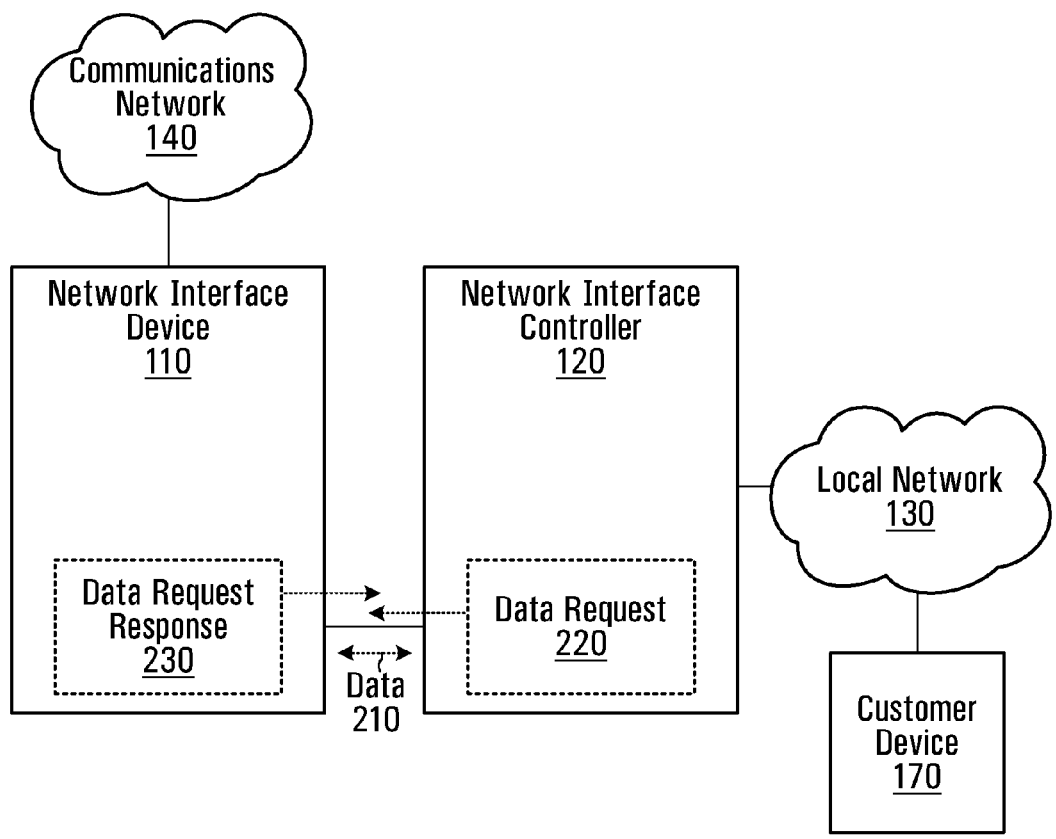
FIG. 2 depicts a system for controlling power to a NID, according to an embodiment of the present invention.

As depicted in FIG. 2, the NIC 120 may also be configured to receive and transmit data being exchanged between the NID 110 and the at least one customer device 170, for example data 210. Within these embodiments the interface 180 may be further configured to communicate with the at least one customer device 170. Within further embodiments there may be at least a second interface configured to communicate with a specific type of the at least one customer device 170, for example a WiFi interface, an ethernet cable, a coaxial cable, or a power line controller interface. Within some embodiments, the data may be processed by the processing module 190 of FIG. 1 to determine the condition of the NID 110.

As is also depicted in FIG. 2, in one embodiment, the condition of the NID 110 may be determined by the NIC 120 by processing certain data, for example the data 210, that is exchanged between the NID 110 and the at least one customer device 170 via the NIC 120. This processing is discussed in more detail below.

In another embodiment, also depicted in FIG. 2, the NIC 120 may be configured to determine a condition of the NID 110 by transmitting a data request 220 to the NID 110. In some embodiments, the data request 220 may comprise a request for health data pertaining to the NID 110. Within these embodiments, the NID 110 is further configured to receive the data request 220 and to respond to the data request 220. Within some embodiments, the NID 110 is configured to further process the data request 220, and determine a data request response 230 in response thereto. In response to the data request 220, the NID 110 may be further configured to transmit the data request response 230 back to the NIC 120. In some embodiments, the data request response 230 may comprise explicit information regarding a condition of the NID 110. The explicit information allows the NIC 120 to determine the condition of the NID 110. In some embodiments the data request response 230 may comprise health data pertaining to the NID 110. The health data pertaining to the NID 110 allows the NIC 120 to determine the condition of the NID 110. Within yet other embodiments, the data request response 230 may comprise data pertaining to the NID 110, without comprising specific health data pertaining to the NID 110. Within yet further embodiments the data request 220 may comprise a ping, and the data request response 230 may comprise a ping response.

When the condition of the NID 110 qualifies as a reset condition, the NID 110 may not be able to respond to the data request 220. For example, a communication subcomponent of the NID 110 may be unable to respond to the data request 220. Thus, within these embodiments, the NIC 120 may determine the condition of the NID 110 by virtue of either the presence or absence of a response to the data request 220.

Returning to FIG. 1, the NIC 120 determines whether the condition of the NID 110 qualifies as a reset condition. In some embodiments, the reset condition signifies that the NID 110 requires resetting. Within other embodiments, the reset condition signifies that at least one component of the NID 110 requires resetting. Within yet other embodiments, the reset condition signifies that the NID is to be reset on a periodic basis. Within other embodiments the condition of the NID 110 may qualify as a non-reset condition of the NID 110, wherein the NID 110 does not require resetting.

To illustrate embodiments where the reset condition signifies that the NID 110 is to be reset on a periodic basis, a non-limiting example is provided. Assume that the reset condition signifies that the NID 110 is to be reset X times per day. In one embodiment, the trigger 125 is configured to cause cycling of the power to the NID 110 X times per day. Alternatively, the NIC 120 may be configured to generate and release the trigger 125 to the power controller 160 X times per day, to cause cycling of power to the NID 110. Within further embodiments, the value of X may be configured by a user of the system. Alternatively, the periodicity may be determined by the NID 110, for example by a management module incorporated into the NID 110, or the NIC 120, for example by the processing module 190. To this end the NIC 120 and/or the NID 110 may further comprise a timing device, such as a clock. In these embodiments, the condition of the NID 110 may qualify as a reset condition, for example, when the time according to the timing device corresponds to a preset time. Alternatively, the condition of the NID 110 may qualify as a reset condition when a time period has elapsed since the previous reset of the NID 110.

The power controller 160 may be any device which is configured to receive the trigger 125 from the NIC 120. In response to receiving the trigger 125, the power controller 160 is further configured to cycle power from the power supply 150 to the NID 110, which in turn causes the NID 110 to reset. In one embodiment, the power controller 160 is configured to switch off power to the NID 110, and subsequently switch on power to the NID 110, to reset the NID 110. In other embodiments, the power controller 160 is configured to switch off power to at least one sub-component of the NID 110, and subsequently switch on power to the at least one sub-component of the NID 110, to reset the NID 110. In some embodiments, the power controller 160 is responsive to configuration of the trigger 125, discussed below, such that the configuration of the trigger 125 dictates whether the power is cycled to the NID 110 or power is cycled to at least one component of the NID 110. In other embodiments, the manner of power cycling to the NID 110 or at least one component of the NID 110, is configured by a user at the power controller 160.

In some embodiments, the trigger 125 may be configured to cause cycling of power to the NID 110 in a manner that is responsive to the reset condition. In further embodiments, the trigger 125 may be configured to cause cycling of power to the NID 110 in a manner that is independent of what the reset condition signifies. For example, the trigger 125 may be configured to cause cycling of power to all components of the NID 110, regardless of whether the reset condition signifies that the NID 110 requires resetting, or whether the reset condition signifies that at least one component of the NID 110 requires resetting.

In yet further embodiments, the trigger 125 may be configured to initiate cycling of power to the NID 110, with the specific manner of power cycling configurable at the power controller 160.

In one non-limiting embodiment, the trigger 125 may comprise an instruction or plurality of instructions to cause cycling of power to the NID 110, such that the manner of cycling power is contained within the instruction or plurality of instructions. In yet other embodiments, the trigger 125 may comprise a electrical signal having a high value and a low value. This electrical signal having a high value and a low value may be independent of what the reset condition signifies, or may be generated in response to what is signified by the reset condition. In other embodiments, where the trigger 125 comprises an electrical signal having a high value and a low value, the trigger 125 may be configured to initiate cycling of power to the NID 110, when one of the high value or the low value is received at the power controller 160.

In general, there will be a time interval between switching off power to the NID 110 or at least one component of the NID 110 and switching on power to the NID 110 or at least one component of the NID 110. In some embodiments, the trigger 125 may comprise information on the duration of the time interval. In other embodiments, the time interval is determined by the duration of the trigger 125. For example, in embodiments where the trigger 125 comprises an electrical signal with a high value and a low value, the trigger 125 may be configured to cause power to the NID 110 to be switched off for the duration of the high value.

In an alternative embodiment, the time interval may be configurable at the power controller 160. Within some embodiments, this time interval may uninfluenced by the configuration of the trigger 125; however, in other embodiments, this time interval is generated in response to the trigger 125, for example, in response to information or instructions comprised in the trigger 125.

Figure 3A:
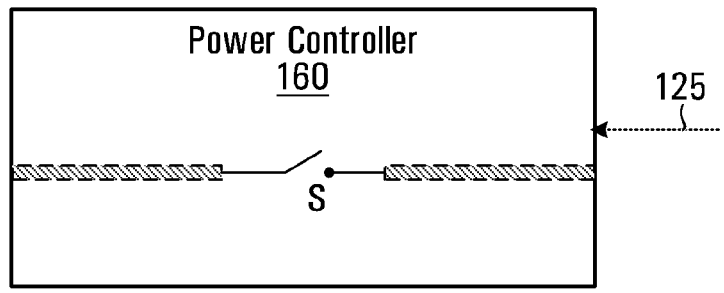
FIG. 3a depicts a power controller for controlling power to a NID, according to an embodiment of the present invention.

FIG. 3a depicts one non-limiting embodiment of the power controller 160. Within this embodiment, the power controller 160 may comprise at least one switch, S, the at least one switch S configured to receive the trigger 125, and further configured to cycle power to the NID 110 or at least one component of the NID 110, once the trigger 125 is received, as described previously. In some embodiments, the at least one switch S may open or close upon receiving the trigger 125, as required, such that power is cycled to the NID 110 or at least one component of the NID 110. Within the embodiment depicted in FIG. 3a, when switch S is closed, the power controller 110 is enabled to supply power to an external device, for example the NID 110. When switch S is open, the power controller 160 is enabled to interrupt power to an external device, for example the NID 110. In one non-limiting example, in the embodiment where the trigger 125 is an electrical signal having a high value and a low value, switch S may be an electromagnetic switch which opens upon receipt of the high value, and closes upon receipt of the low value.

Figure 3B:
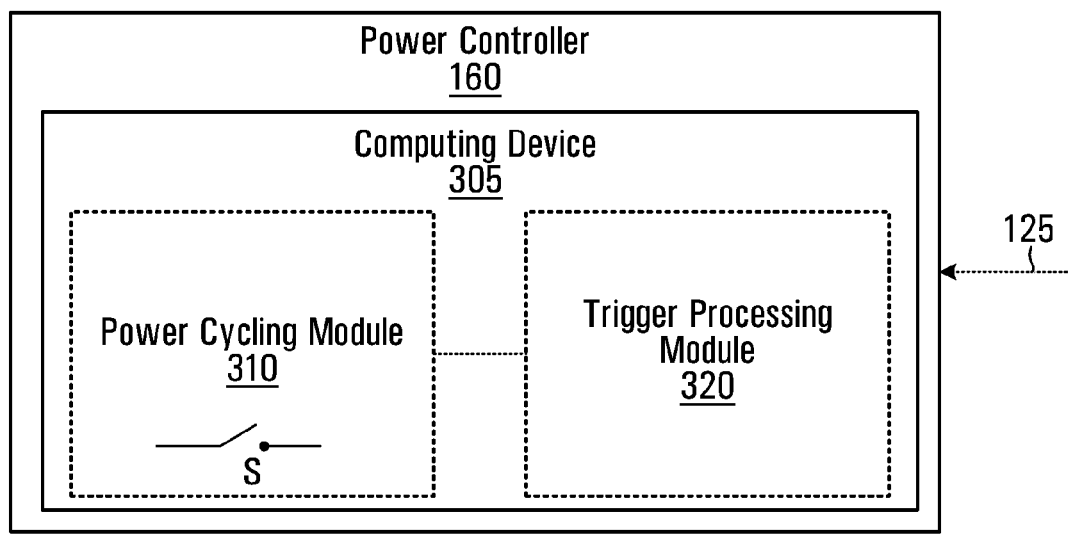
FIG. 3b depicts a power controller for controlling power to a NID, according to an embodiment of the present invention.

In other embodiments, as depicted in FIG. 3b, the power controller 160 comprises a computing device 305. The computing device 305 may be configured to further process the trigger 125, and to cycle power to the NID 110 in response to the computing device 305 processing the trigger 125. In embodiments where the trigger 125 comprises an instruction or plurality of instructions, the computing device 305 may be configured to process the instruction or plurality of instructions, and cycle power to the NID 110 accordingly. Within other embodiments, the computing device 305 may be configured to cycle power to the NID 110 upon receipt of the trigger 125, in a manner that is independent of the configuration of the trigger 125.

In one embodiment where the power controller 160 comprises computing device 305, as further depicted in FIG. 3b, the computing device 305 may further comprise a power cycling module 310 and/or a trigger processing module 320, as modules of the computing device 305. The power cycling module 310 may comprise the at least one switch, S, and is configured to receive power from a power source, for example the power supply 150.

Within embodiments where the power controller 160 further comprises a trigger processing module 320, the trigger processing module 320 may be enabled to receive the trigger 125, for example from the NIC 120, and process the trigger 125. The trigger processing module 320 may be further operable to communicate with the power cycling module 310, to enable the cycling of power. In some embodiments, this may comprise transmitting a signal to the power cycling module 310 to initiate power cycling. Within other embodiments, this may comprise instructing the power cycling module 310 on how the power is to be cycled.

Within other embodiments, the power cycling module 310 and the trigger processing module 320 may be combined into a single module. Within yet other embodiments the power cycling module 310 may be external to the computing device 305.

Various embodiments for implementing the NIC 120 will be described in detail herein below with reference to FIGS. 4 to 12. It is noted that FIGS. 4 to 12 depict systems similar to FIG. 1 with like components represented by like numbers. Within these embodiments, the power supply 150 supplies power to the NID 110 via the power controller 160, similar to the system depicted in FIG. 1.

Figure 4A:
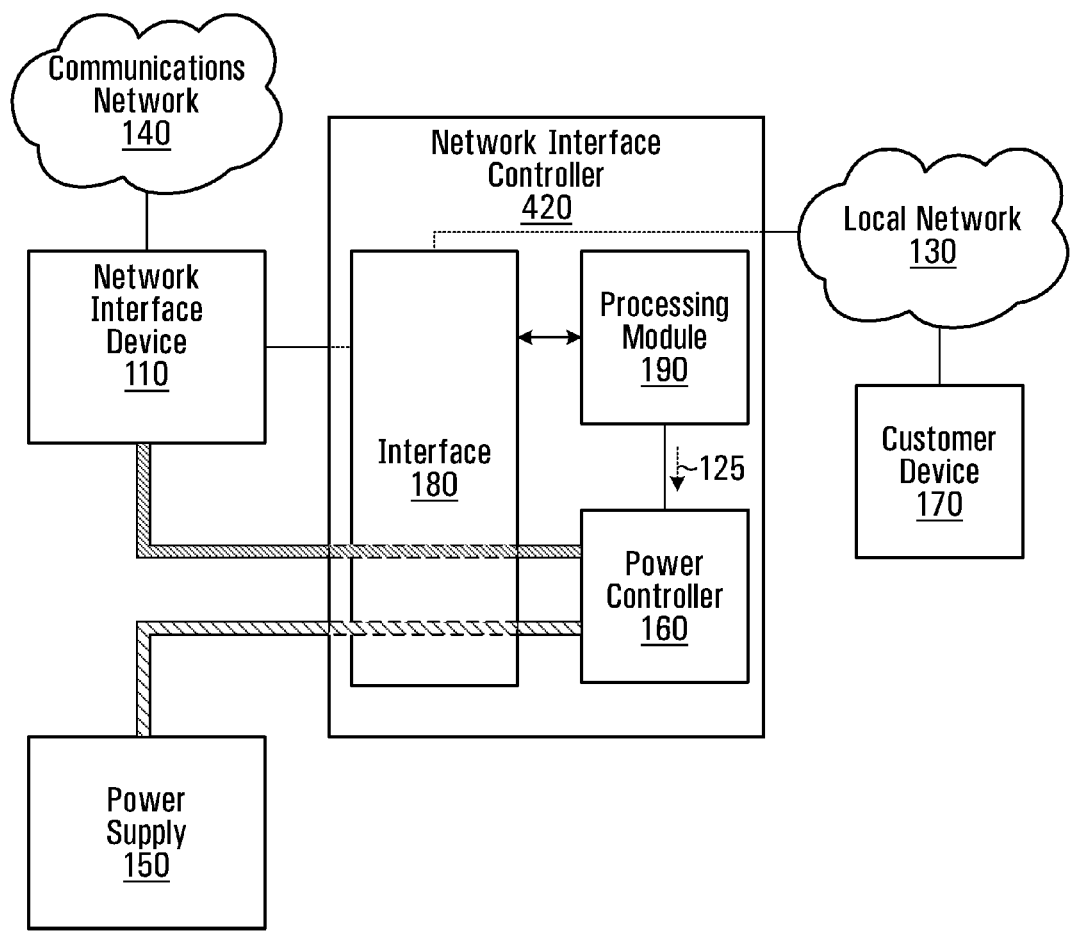
FIGS. 4 to 12 depict systems for controlling power to a NID, according to various alternative embodiments of the present invention.

FIG. 4a depicts a system, according to an alternative embodiment of the present invention, for controlling power to the NID 110. Within the system depicted in FIG. 4, an alternative embodiment of the NIC 120 is also depicted. The NIC 420 is similar to the NIC 120 with like components represented by like numbers; however, power controller 160 is further incorporated into the NIC 420. Within these embodiments, the NIC 420 is configured to receive power from the power supply 150, and in turn supply power to the NID 110. Within this embodiment, interface 180 may be further configured to receive the output of the power supply 150, however in an alternative embodiment there may be a power interface for connecting with the power supply 150. Within these embodiments the power controller 160 is configured to receive the trigger 125 from processing module 190. The trigger 125 may be released to the power controller 160 via a connection between the processing module 190 and the power controller 160; alternatively (not depicted), the trigger may be released from the processing module 190 to the power controller 160 via another component of the system. In one non-limiting example, the trigger 125 may be released from the processing module 190 to the power controller 160 via the interface 180.

The power controller 160 is further configured to control power to the NID 110, as described previously, via the interface 180. As depicted in FIG. 4, data is exchanged between the NID 110 and the NIC 420 via a first connection, and power is conveyed to the NID 110 from the NIC 420 via a second connection. However, in an alternative embodiment, there may be a single connection between the NIC 420 and NID 110 configured to both exchange data and convey power. This may occur via a power line controller, as is well known to persons of skill in the art.

Figure 4B:
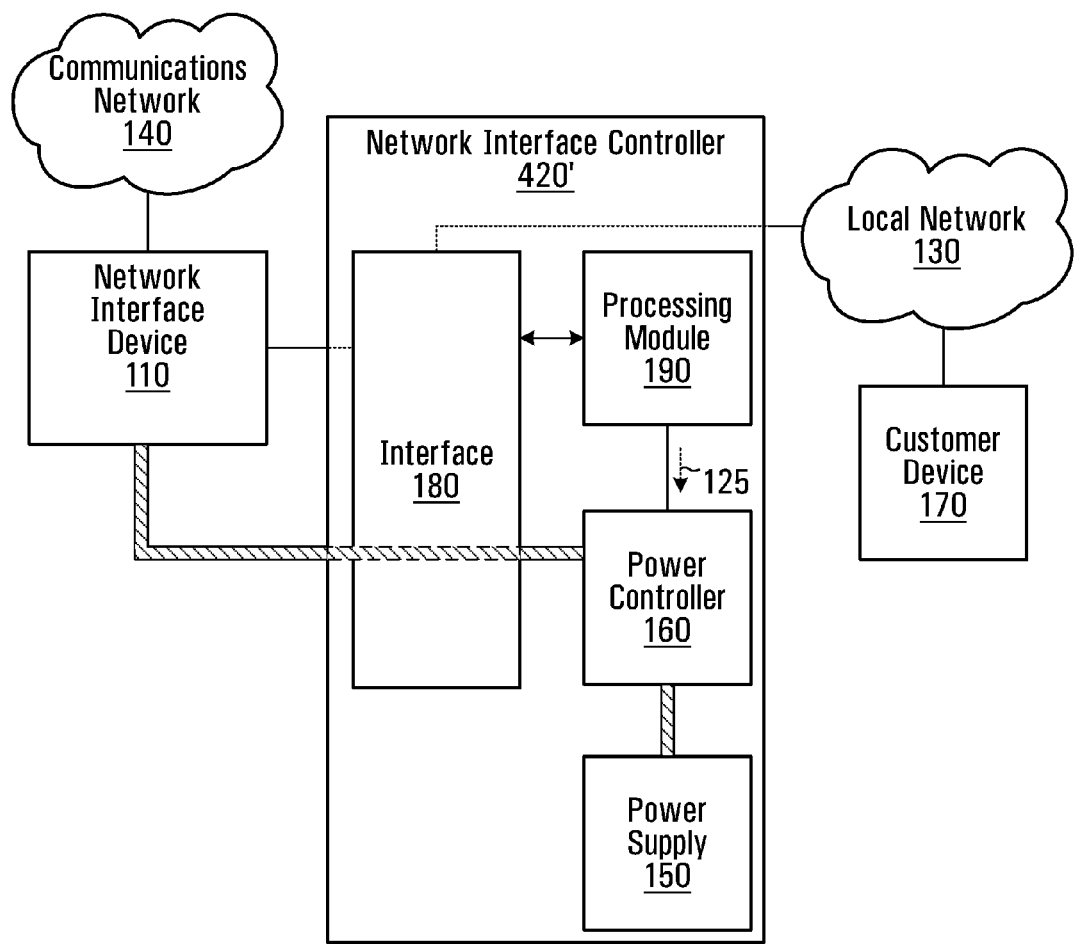

FIG. 4b depicts a system, according to an alternative embodiment of the present invention, for controlling power to the NID 110. Within the system depicted in FIG. 5, an alternative embodiment of the NIC 420 is depicted by the numeral 420'. The NIC 420' is similar to the NIC 420 with like components represented by like numbers; NIC 420' does not have an interface 180. Within this embodiment, NID 110 is connected directly to the customer device 170, via local network 130. The processing module 190 is configured to generate the trigger 125 periodically, as discussed previously, for example X times per day, and transmit the trigger 125 to the power controller 160, which cycles power to the NID 110 in response to receiving the trigger 125. In this manner power to the NID 110 is cycled X times per day, corresponding resetting the NID 110 X times per day. In this embodiment a condition of the NID 110 is not monitored. In an alternative embodiment the processing module 190 may be incorporated into the power controller 160.

Figure 5:
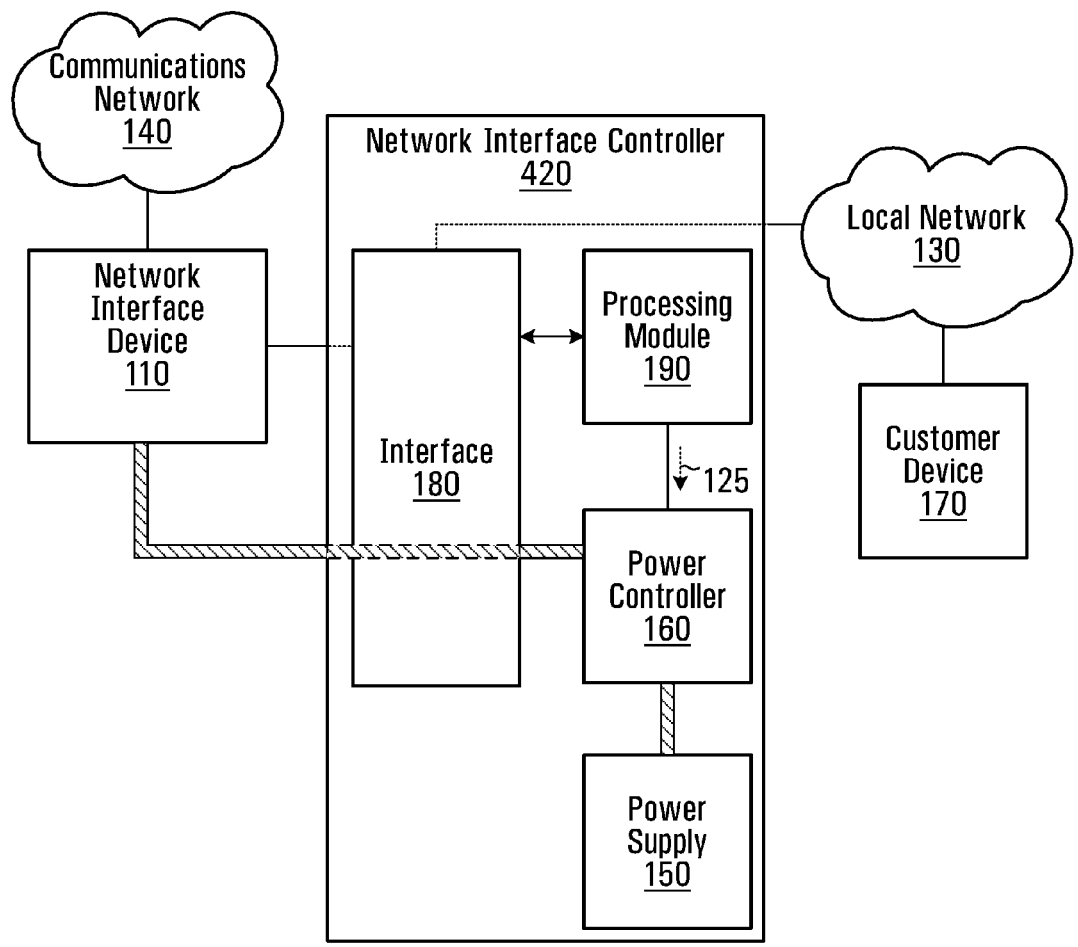

FIG. 5 depicts a system, according to an alternative embodiment of the present invention, for controlling power to the NID 110. Within the system depicted in FIG. 5, an alternative embodiment of the NIC 420 is depicted by the numeral 520. The NIC 520 is similar to the NIC 420 with like components represented by like numbers; however, power supply 150 is further incorporated into the NIC 520.

Figure 6:
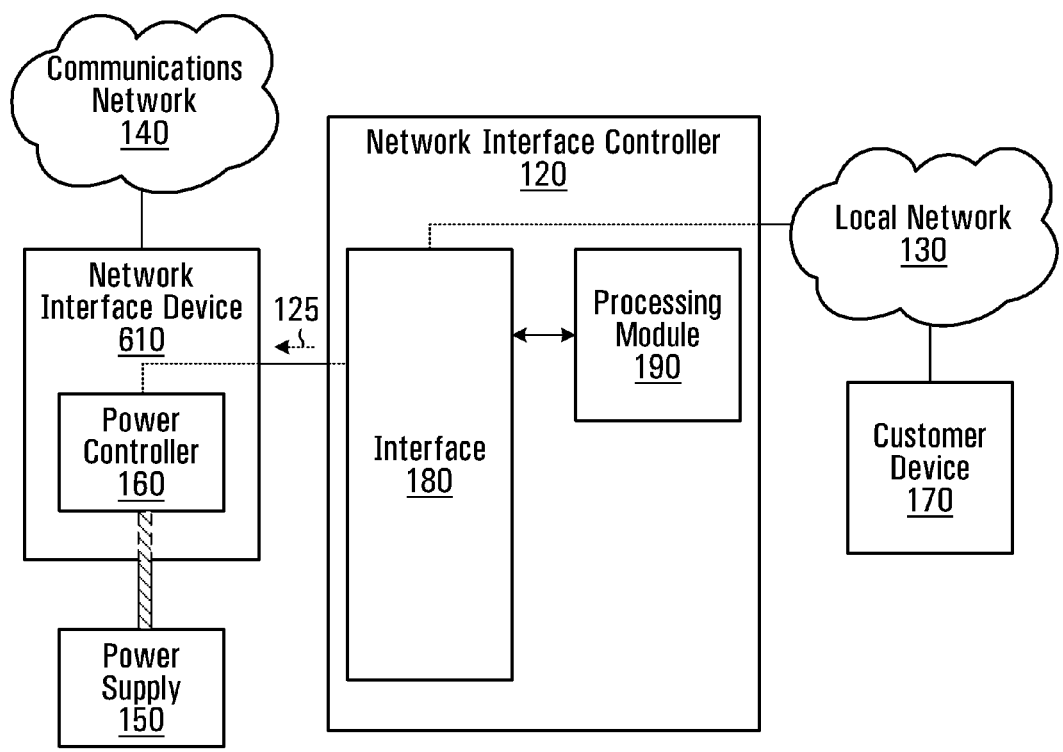

FIG. 6 depicts a system, according to an alternative embodiment of the present invention, for controlling power to a variant of the NID 110, depicted by the numeral 610. In some embodiments, as depicted within the system of FIG. 6, power controller 160 is incorporated into the NID 610. Within this embodiment the trigger 125 is transmitted to the NID 610, and received at the power controller 160.

Figure 7:
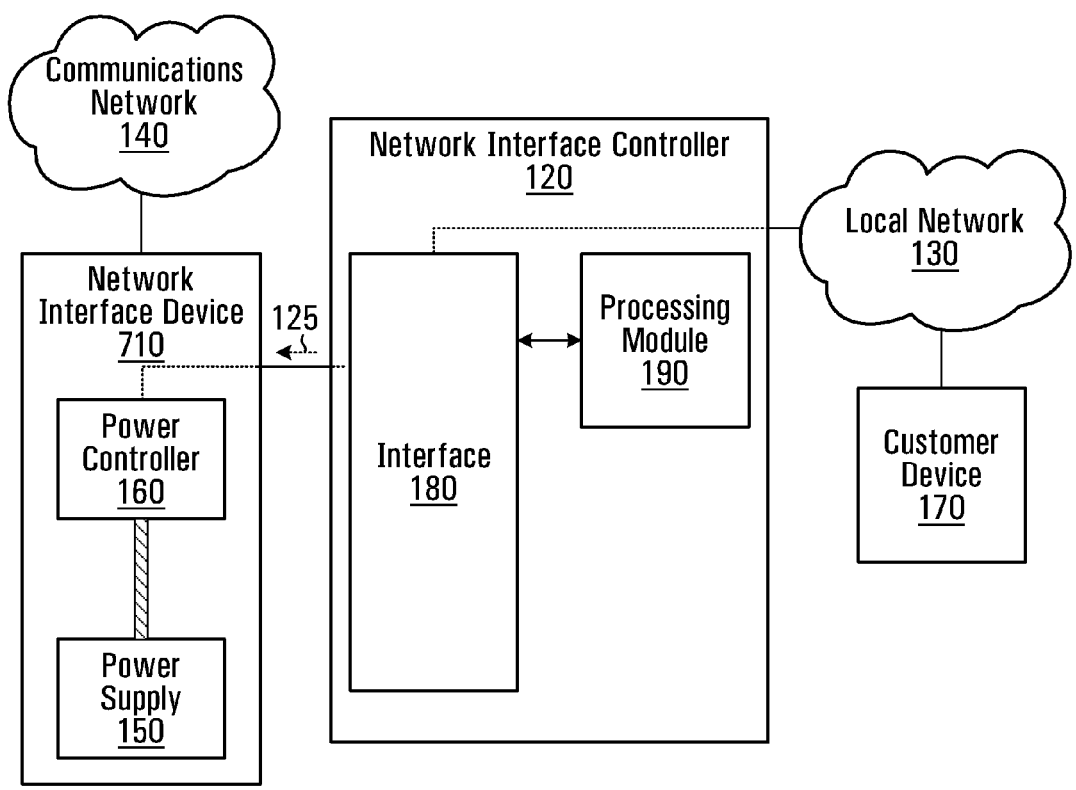

Within alternative embodiments, as depicted in FIG. 7, power supply 150 may also be incorporated into a variant of the NID 110, depicted by the numeral 710, with similar connections and functionality as described previously.

Figure 8:
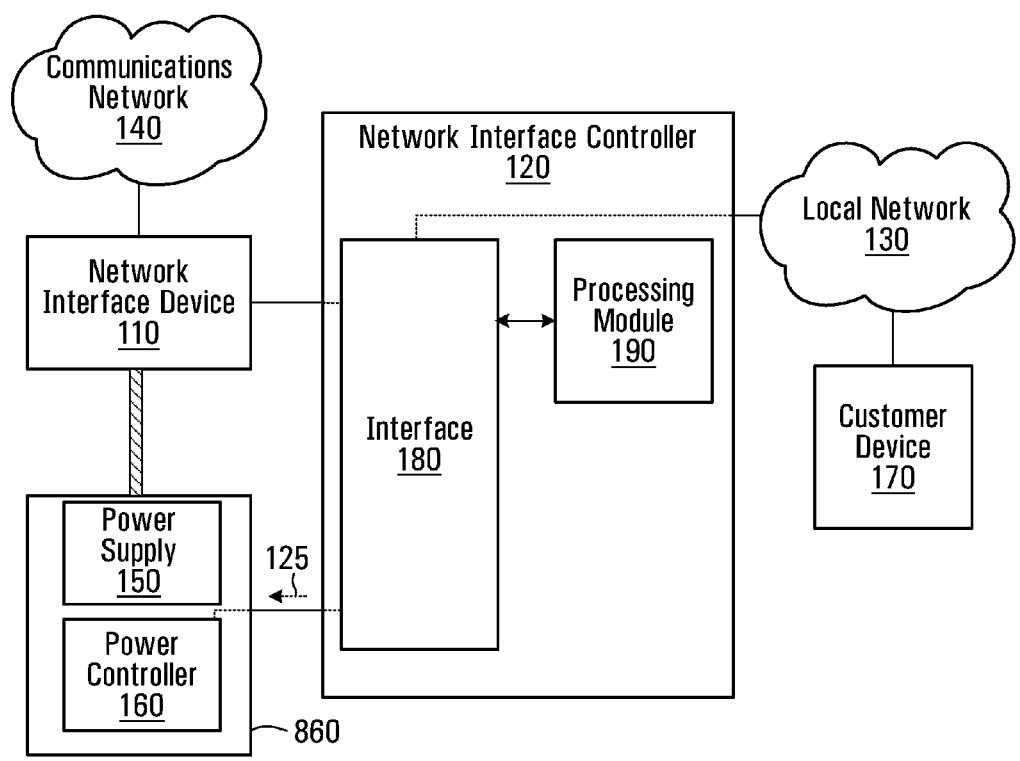

FIG. 8 depicts a system, according to an alternative embodiment of the present invention, for controlling power to the NID 110. In some embodiments, as depicted within the system of FIG. 8, power controller 160 and power supply 150 may be incorporated into a single device 860. Within this embodiment the trigger 125 is transmitted to the device 860, and received at the power controller 160. It should be understood that in lieu of the combined device 860, in some embodiments the power controller 160 may be contained within the power supply 150, or the power supply 150 may be contained with the power controller 160.

In FIG. 4 to FIG. 8, different embodiments of the invention have been depicted, illustrating how power controller 160 and power supply 150 may be configured in different embodiments. However, in all embodiments the power supply 150 supplies power to the NID 110, via the power controller 160, and the power controller 160 cycles power to the NID 110 in response to receiving a trigger 125 from the NIC 120. However, the location of the power supply 150 and power supply 160 may be varied in further embodiments, with the appropriate connections.

Figure 9:
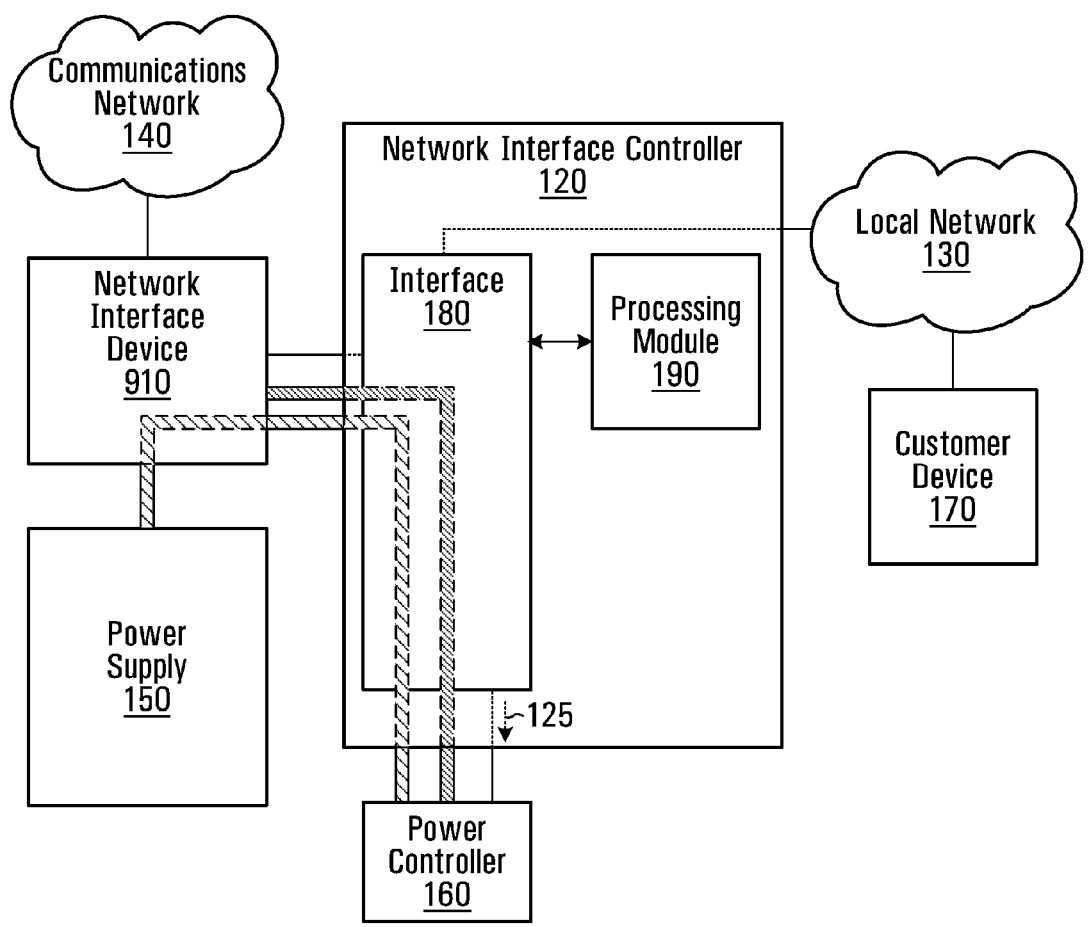

In a non-limiting example, as depicted in FIG. 9, the power supply 150 is connected to a variant of the NID 110, depicted by the numeral 910. Power is routed through the NID 910 to the NIC 120, via the interface 180. In this embodiment, the connections between the NID 910 and the power supply 150 comprise a connection for routing power to the NIC 120: power is not supplied to the NID 910 via this connection. The power controller 160 is also connected to the NIC 120 via the interface 180, and in communication with the processing module 190, such that the trigger 125 is transmitted from the processing module 190 to the power controller 160, as described previously. Power from the power supply 150 is further routed through the interface 180 to the power controller 160, and then back through the interface 180 to the NID 910. In this manner, the power controller 160 receives the trigger 125 and controls power to the NID 910 in response to receiving the trigger 125.

Figure 10A:
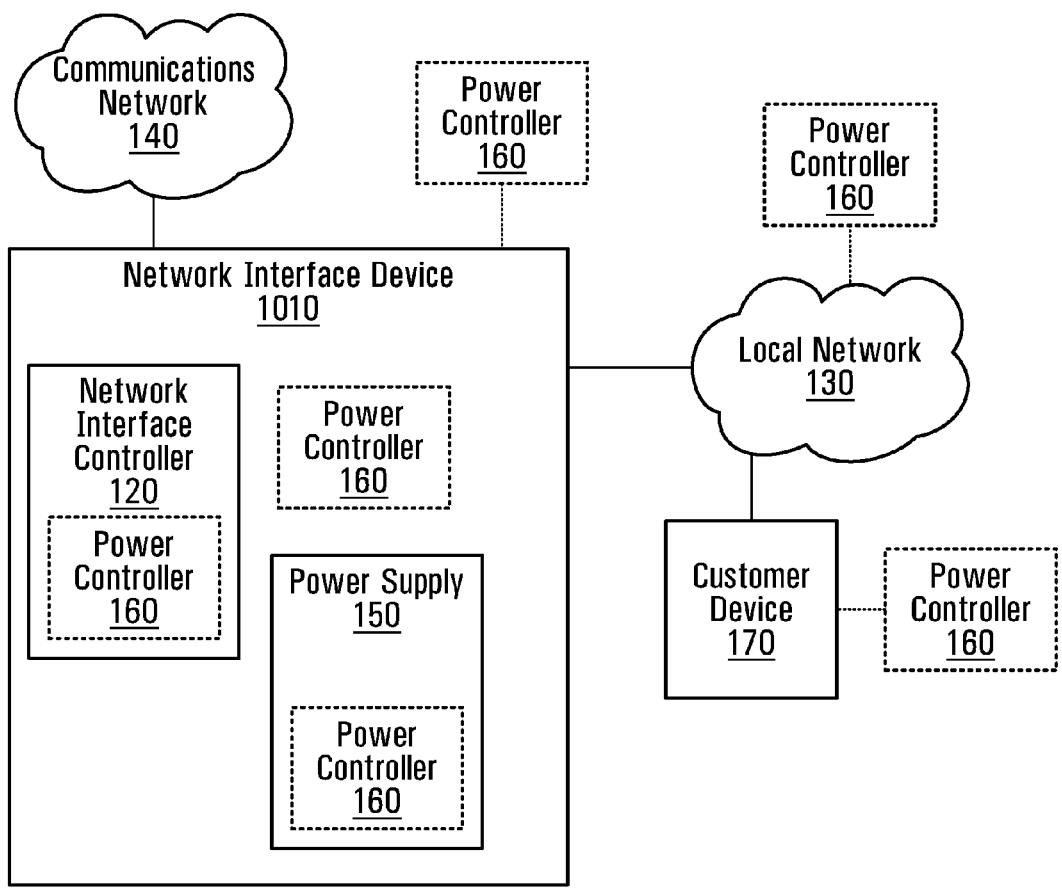

In yet another non-limiting embodiment, as depicted in FIG. 10a, the power supply 150 and the NIC 120 may be further incorporated into a variant of the NID 110, depicted by the numeral 1010. The various connections between the devices are not depicted within FIG. 10a for the sake of simplicity. Within this embodiment, the power controller 160 may be incorporated into the NID 1010, within the NIC 120, within the power supply 150, external to but connected to the NID 1010, or connected to the customer device 170 or the local network 130, with data and power connections routed accordingly. The various possible locations of the power controller 160 are depicted in FIG. 10a, using broken lines.

Figure 10B:
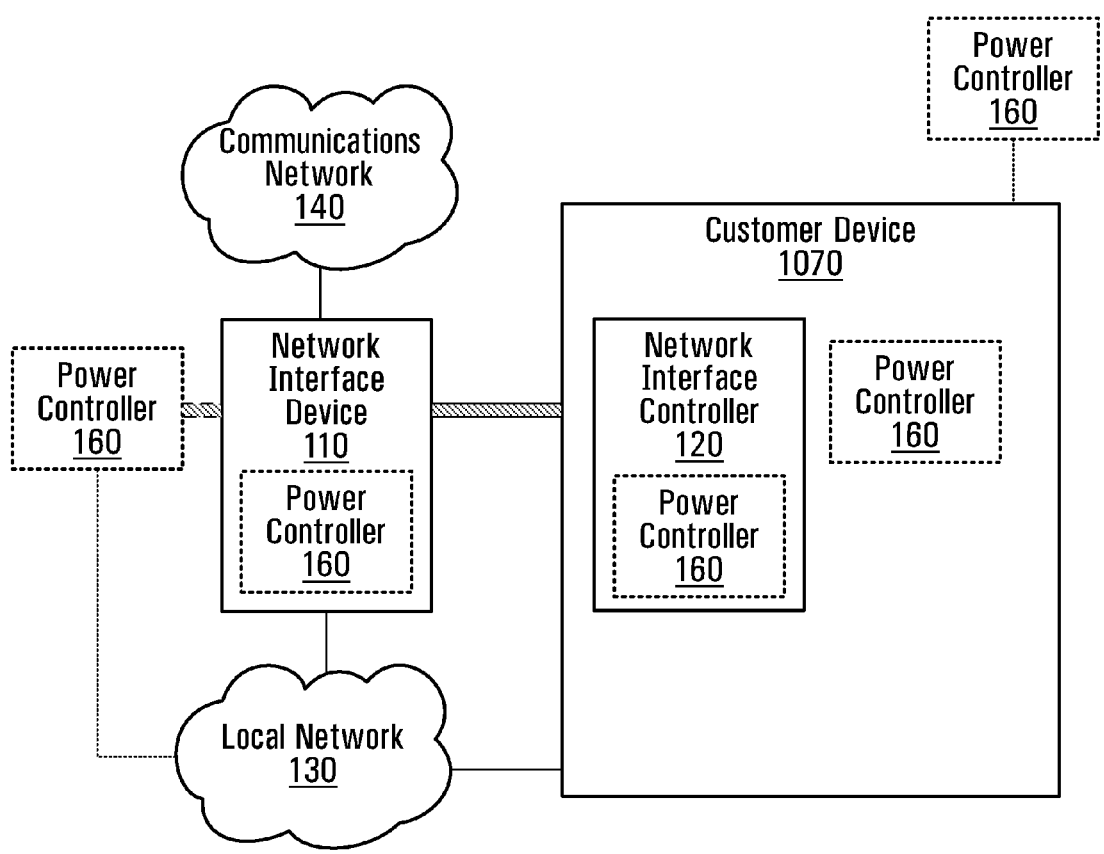

In yet another non-limiting embodiment, as depicted in FIG. 10b, the NIC 120 may be further incorporated into a variant of the customer device 170, depicted by the numeral 1070. The various connections between the devices within the customer device 1070 are not depicted within FIG. 10b for the sake of simplicity. Within this embodiment, the power controller 160 may be incorporated into the NID 110, within the NIC 120, or connected to the NID 110, with data and power connections routed accordingly. The various possible locations of the power controller 160 are depicted in FIG. 10b, using broken lines. In addition a power supply, similar to the power supply 150 of FIG. 1, may be suitably located within the system; power controller 160 may also be located within this power supply. Within these embodiments, there is at least one data connection between the NID 110 and the customer device 1070, and at least one power connection between the NID 110 and the power controller 160. Within FIG. 10*b* two possible sets of connections have been depicted. In the first, there is a data connection between the NID 110 and the customer device 1070 via the local network 130, and a power connection between the NID 110 and the customer device 1070. However in another embodiment, where the power controller 160 is connected to the NID 110, there is a further data connection between the power controller 160 and the customer device 1070 via local network 160, as well as a power connection between the power controller 160 and the NID 110. Within this embodiment, a trigger, similar to trigger 125 depicted in FIG. 1, may be transmitted to the power controller 160, from the NIC 120, through the local network 130, such that power controller 160 can control power to the NID 110. With this embodiment a power supply may be connected the NID 110 via the power controller 160.

Figure 11:
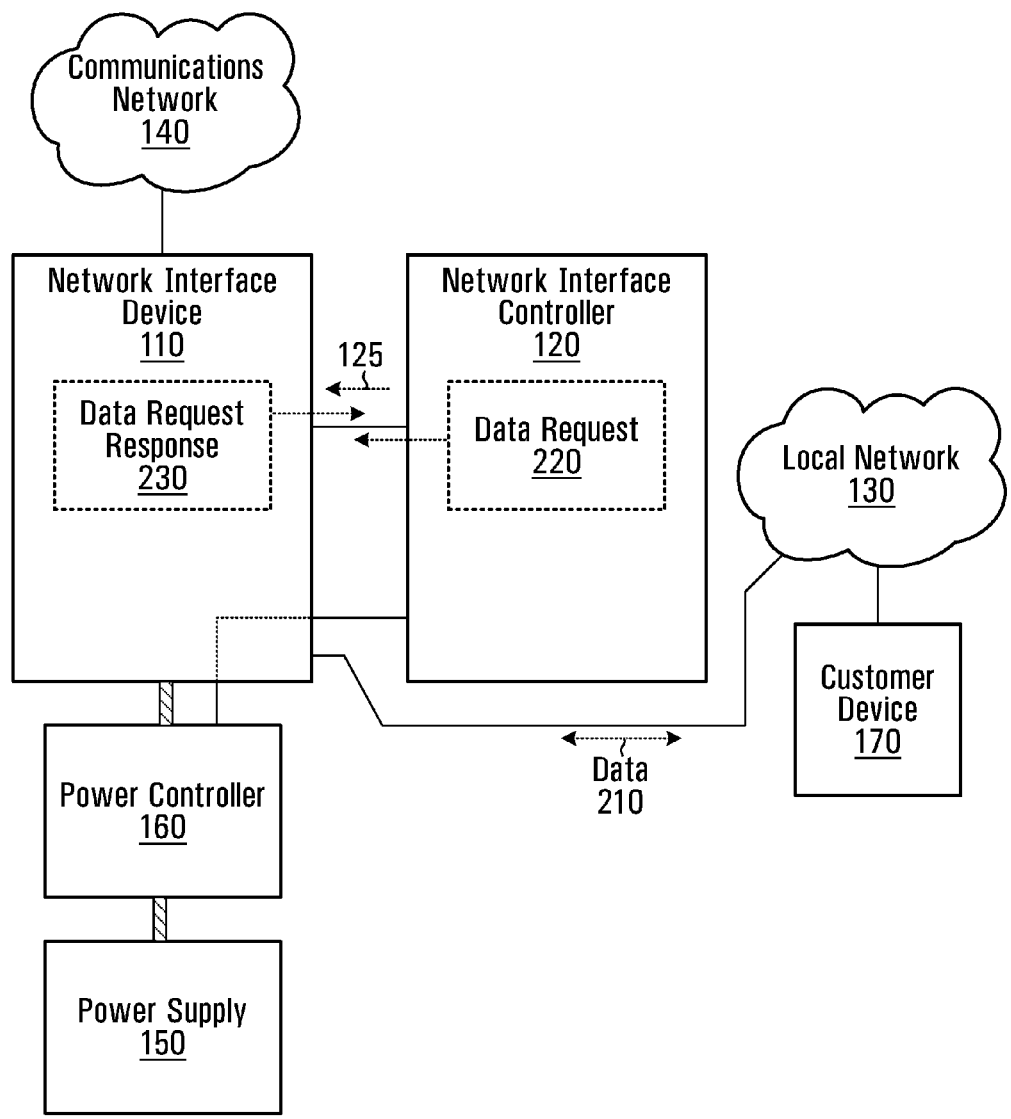

In some embodiments, as depicted within the system of FIG. 11, the NIC 120 may be connected to the at least one local network 130 or the at least one customer device 170 via the NID 110. Within this embodiment, data being exchanged between the NID 110 and the at least one local network 130, for example data 210, is not exchanged via the NIC 120. This is in contrast to the system depicted in FIG. 2, where data 210 being exchanged between the NID 110 and the at least one local network 130 is exchanged via the NIC 120.

Within the embodiment depicted in FIG. 11, the NIC 120 may be configured to determine a condition of the NID 110 by transmitting the data request 220 to the NID 110, as discussed previously. However, in this embodiment, the data request 220 may comprise a request for a copy of the data exchanged between the NID 110 and the at least one customer device 170. In turn, the NID 110 may be configured to respond with a data request response 230, which may comprise a copy of at least a portion of the data 210. Alternatively, the NID 110, the local network 130, or the customer device 170 may be configured to continually send a data request response 230, comprising at least a portion of the data 210, to the NIC 120. Within this embodiment the NIC 120 may not transmit the data request 220.

Within the system depicted in FIG. 11, the power supply 150 supplies power to the NID 110 via the power controller 160. Further, the power controller 160 is in communication with the NIC 160 via the NID 110. However in further embodiments, the power controller 160 may be directly connected to the NIC 120. In yet further embodiments, the location of the power controller 160 and the power supply 150 may vary as described above in FIGS. 1, and 3 to 10, as appropriate.

Figure 12:
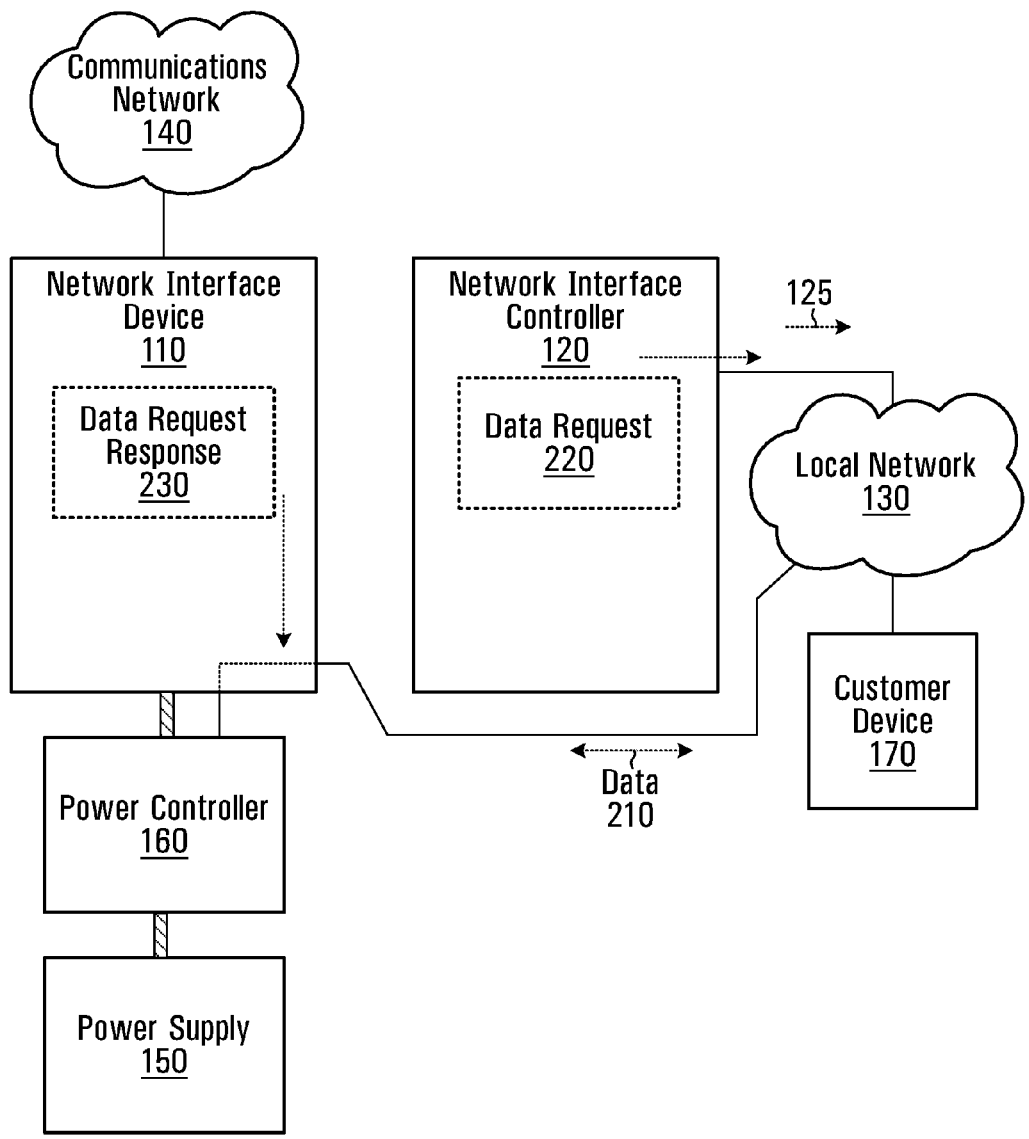

In yet further embodiments, as depicted within the system of FIG. 12, NIC 120 may be connected to the NID 110 via the at least one local network 130 or alternatively via the at least one customer device 170 (not depicted). The NIC 120 may thus determine the condition of the NID 110 via the at least one local network 130. This embodiment is similar to the embodiment depicted in FIG. 11, however the data request 220 originating from the NIC 120 is transmitted to the NID 120 via the at least one local network 130. Similarly, the data request response 230 is transmitted to the NIC 120 via the at least one local network 130. In embodiments where the data request 220 comprises a copy of at least a portion of the data 210 being exchanged between the NID 110 and the at least one customer device 170, the data request response 230 may be received from either the NID 110, the at least one customer device 170, or by elements present within the at least one local network 130. Alternatively, the NID 110, the local network 130, or the customer device 170 may be configured to continually send a data request response 230, comprising at least a portion of the data 210, to the NIC 120. Within this embodiment the NIC 120 may not transmit the data request 220. In yet further embodiments, the location of the power controller 160 and the power supply 150 may vary as described above in FIGS. 1, and 3 to 10, as appropriate. In one non-limiting example, power controller 160 may be coupled to local network 130.

Figure 13:
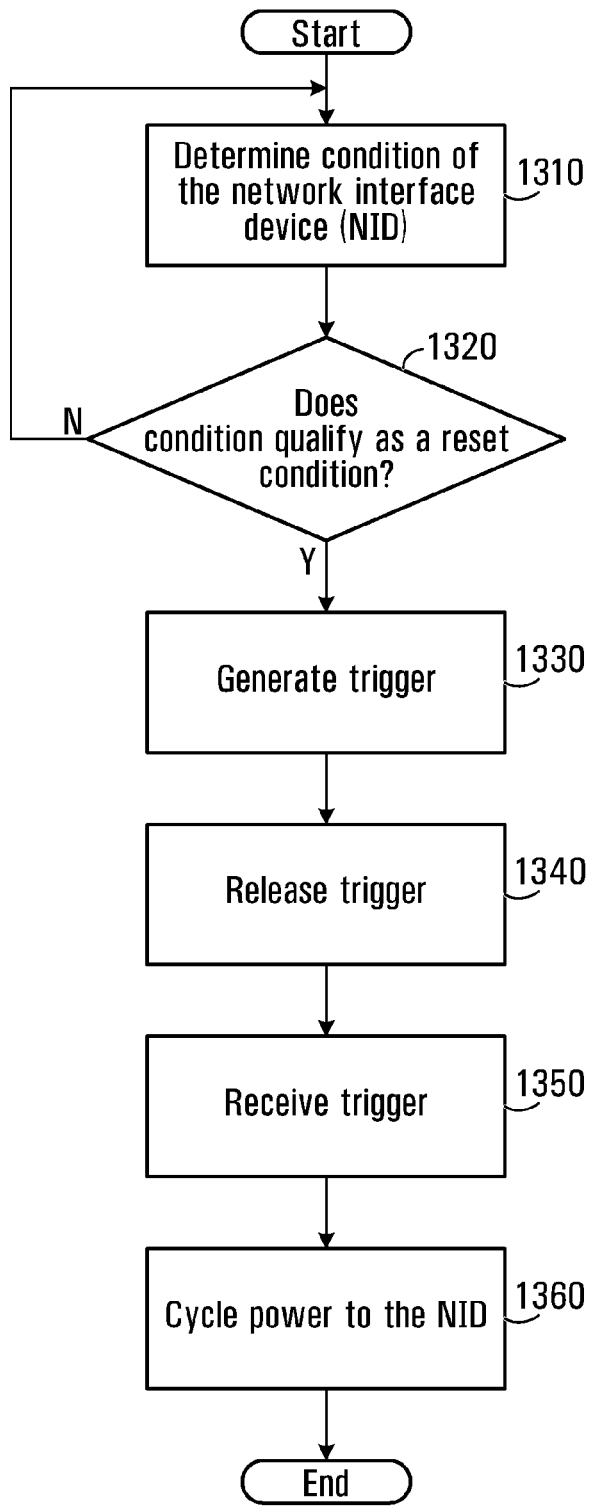
FIG. 13 depicts a method for controlling power to a NID.

A method for controlling a NID, according to an embodiment of the present invention, will now be described with reference to FIG. 13. In order to assist in the explanation of the method, it will be assumed that the method of FIG. 13 is implemented using the system of FIG. 1. Further, it is to be understood that the method of FIG. 13 may be operated using any of the systems depicted in FIG. 1, or FIGS. 4 to 12. Furthermore, the following discussion of the method of FIG. 13 will lead to a further understanding of the systems of FIG. 1, and FIGS. 4 to 12 and their various components. It should be understood that the steps in the method of FIG. 13 need not be performed in the sequence shown. Further, it is to be understood that the system of FIG. 1 and/or the method of FIG. 13 can be varied, and need not work as discussed herein in conjunction with each other, and that such variations are within the scope of the present invention.

By way of illustration only, the method of FIG. 13 will be described, when appropriate, being executable within the NIC 120, and the power controller 160.

At step 1310, executable within the NIC 120, a condition of the NID 110 is determined. In one embodiment, this determination may be accomplished by the NIC 120 receiving data being exchanged between the NID 110 and the at least one customer device 170. As discussed previously, in some embodiments, such data is exchanged via the NIC 120, while in further embodiments the NIC 120 receives a copy of the data in question. Within these embodiments, the determination of the condition of the NID 110 may be effected by processing the data. In further embodiments, the determination of the condition of the NID 110 may be accomplished by the NIC 120 effecting a transmission of the data request 220 to the NID 110. Within some embodiments, as discussed previously, a data request response 230 is received. The determination of the condition of the NID 110 may be accomplished via the processing of the data request response 230. However, as also discussed previously, if the NID 110 is unable to respond to the data request 220, the determination of the condition of the NID 110 may be accomplished by virtue of the absence of a response to the data request 220.

In another embodiment, the determination of the condition of the NID 110 may comprise measuring a data exchange rate between the NID 110 and the at least one customer device 170. In some embodiments, the data exchange rate is subsequently processed to effect the determination.

In yet further embodiments the determination of the condition of the NID 110 may comprise determining the time elapsed since the last reset of the NID 110. In yet another embodiment, the determination of the condition of the NID 110 may comprise determining of a time that the NID 110 is scheduled to be reset.

Other methods of determining a condition of the NID 110 may occur to those of skill in the art and are within the scope of the present invention.

In some embodiments, the determination of the condition of the NID 110 may occur continuously. Within other embodiments, the determination of the condition of the NID 110 may occur periodically. For example within the embodiment where the determination is made by monitoring the data exchange rate between the NID 110 and the at least one customer device 170, the determination may occur continuously by examining the data exchange rate for all data. However, the determination may also be made by examining the data exchange rate at periodic intervals. Similarly, within the embodiment where the determination is accomplished by the NIC 120 effecting a transmission of the data request 220 to the NID 110, the data request 220 may be transmitted on a periodic basis. Alternatively, the data request 220 may be transmitted until a data request response 230 is received, and then the periodic transmission of the data request 220 may resume after the processing of the data request response 230, received in response to the data request 220.

At step 1320, executable within the NIC 120, it is determined whether the condition of the NID 110 qualifies as a reset condition. One example of a reset condition is a condition where the NID 110, or at least one component of the NID 110, requires resetting. If the condition of the NID 110 does not qualify as a reset condition, the NIC 120 returns to determining a condition of the NID 110 at step 1310.

In embodiments where the determination of the condition of the NID 110 comprises processing data being exchanged between the NID 110 and the at least one customer device 170, it may be determined that the condition of the NID 110 qualifies as a reset condition if the quality of the data is poor. In one non-limiting example, determining the quality of the data comprises determining if data contains one or more predetermined errors. In another non-limiting example, determining the quality of the data comprises determining the number of errors present in the data. In this embodiment the condition of the NID 110 may qualify as a reset condition if the number of errors in the data is sufficiently high for a deterioration in service to be noticeable to a user of the at least one customer device 170, for example if the error rate is above a threshold error rate. In an alternative embodiment, it may be determined that the condition of the NID 110 qualifies as a reset condition if there is no data to process, for example when no data is exchanged between the NID 110 and the customer device 170 within a defined time period.

In embodiments where the determination of the condition of the NID 110 comprises measuring a data exchange rate, it may be determined that the condition of the NID 110 qualifies as a reset condition if the data exchange rate is too low, for example below a threshold data exchange rate. In one non-limiting example, the threshold data exchange rate may be zero; in another non-limiting example, the threshold data exchange rate may be low enough for a deterioration in service to be noticeable to the user of the at least one customer device 170.

In embodiments where the determination of the condition of the NID 110 comprises effecting a transmission of a data request 220 to the NID 110, and subsequently receiving and processing a data request response 230, it may be determined that the condition of the NID 110 qualifies as a reset condition if the data request response 230 indicates that the health of the NID 110 is poor. Alternatively, within this embodiment, the condition of the NID 110 may qualify as a reset condition if no data request response 230 is received in response to the transmission of the data request 220 to the NID 110.

In yet further embodiments, it may be determined that the condition of the NID 110 qualifies as a reset condition if the NID 110 is to be reset periodically, as discussed previously. Within this embodiment, the condition of the NID 110 may qualify as a reset condition, if the current time of day corresponds to a predetermined reset time. Alternatively, the condition of the NID 110 may qualify as a reset condition if a specified time period has elapsed since the last reset of the NID 110.

In yet further embodiments, it may be determined that the condition of the NID 110 qualifies as a reset condition using a plurality of the above described techniques. In one non-limiting example, the condition of the NID 110 may qualify as a reset condition if either a data request response 230 indicates that the health of the NID 110 is poor, or if the current time of day corresponds to a pre-determined reset time. One should understand that other combinations are possible.

If it is determined, at step 1320, that the condition of the NID 110 qualifies as a reset condition, the NIC 120 proceeds to step 1330, where the NIC 120 generates the trigger 125 for causing cycling of power to the NID 110, as discussed previously. The various embodiments of the trigger 125 have also been discussed previously. At step 1340, the trigger 125 is released to the power controller 160.

At step 1350, the trigger 125 is received by the power controller 160. In embodiments where the NIC 120 does not comprise the power controller 160, the trigger 125 is received by the power controller 160, via the connection, or connections, between itself and the NIC 120. At step 1360, the cycling of power to the NID 110 occurs in the manner described previously, effecting the reset of the NID 110.

Figure 14:
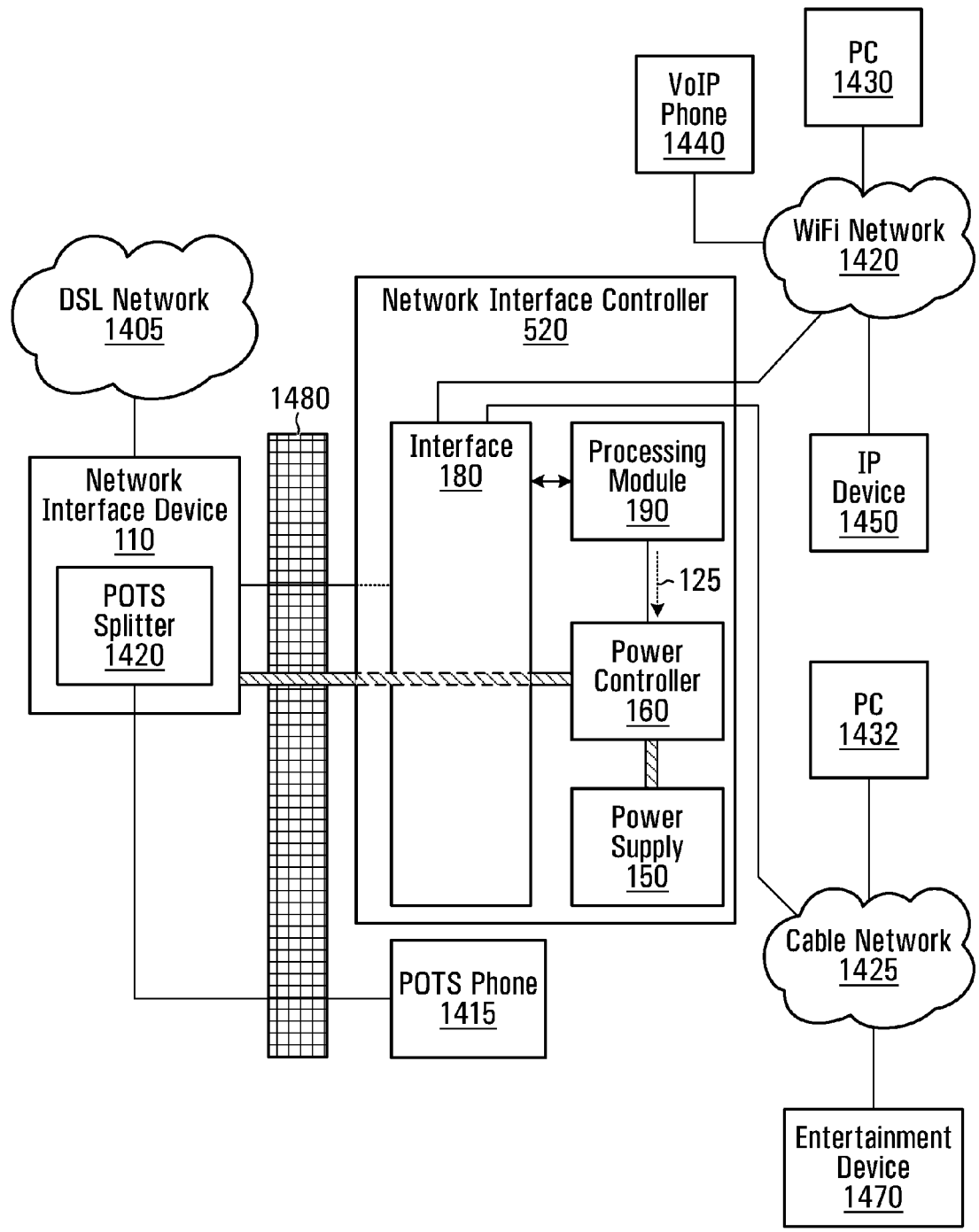
FIG. 14 depicts a non-limiting example of a NID installation at a customer premises, in which one embodiment of the present invention is implemented.

FIG. 14 illustrates an implementation of the system of FIG. 5 in one particular embodiment of the present invention, though the actual locations of the components may vary in further embodiments and should not limit the scope of the embodiment. In this example, the NID 110 is mounted to an exterior wall 1480 of a customer premises, for example a customer home, while the NIC 520 is located interior to the customer premises. Within this embodiment the NIC 520 comprises the power controller 160 and the power supply 150. The NID 110 comprises a POTS splitter 1410 which is in communication with at least one POTS phone 1415. The NID 110 is coupled to a communication network which comprises a DSL network 1405 configured to communicate both digital DSL signals and analog POTS signals, collectively called a composite signal herein below.

The POTS splitter 1410 comprises a device which is configured to filter out the digital DSL signals from the composite signal received from network 1405. In one non-limiting example, the POTS splitter 1410 may comprise a filter which filters out higher frequency DSL signals, but allows lower frequency analog POTS signals through to the at least one POTS phone 1415. A non-limiting example of an enhanced POTS splitter 1420 is disclosed in a Canadian patent application entitled "Apparatus and System for Controlling Signal Filtering" to Chan being filed on the same day as the present application and bearing an application number [not yet available], having an Ser. No. 12/095,395. The content of the aforesaid patent application is hereby incorporated by reference herein in its entirety.

The NIC 520 is in wireless communication with a first local network comprising a WiFi Network 1420. The NIC 520 is further in wired communication with a second local network comprising a cable network 1425, for example a coax network or an Ethernet network. Each of the WiFi Network 1420 and cable network 1425 may be in further communication with at least one customer device. Within this example, the interface 180 comprises at least a WiFi interface and a cable interface. For example the WiFi Network 1420 may be in further communication with a first personal computer (PC) 1430, a VoIP Phone 1440 and a further IP device 1450. For example, the IP device 1450 may comprise a PDA (personal digital assistant), a Web appliance, an IPTV set top box, another PC, another VoIP phone. Other IP devices may occur to those of skill in the art. The cable network 1425 may be in further communication with a second PC 1432, and an entertainment device 1470. For example, the entertainment device 1470 may comprise a set top box, a music download appliance, or another PC. Though specific customer devices have been described in specific relation to each of the two local networks, different combinations of customer devices may be in communication with each of the local networks 1420, 1425 and the invention is not limited to a specific combination. For example, the cable network 1425 may also be in communication with another VoIP phone, a plurality of personal computers and/or other IP devices; the WiFi Network 1420 may also be in communication with an entertainment device and/or a plurality of PC's. Further, although the system of FIG. 14 is depicted with the cable network 1425 and the WiFi network 1420, the system could include other local networks or could include only one local network.

Within this embodiment, the NIC 120 determines the condition of the NID 110, and generates the trigger 125 responsive to the condition of the NID qualifying as a reset condition. The trigger is released to the power controller 160 to cause cycling of power to the NID 110 as discussed previously. Hence, the NID 110 may be reset without resorting to a truck roll by the service provider, and without requiring the customer to visit the NID 110 mounted to the exterior wall 1480.

The location of the NID 110 allows the service provider to service the NID 110 without having to rely on the customer being at the customer premises. In addition, the location of the NID 110 allows the customer to conveniently change service providers. For example, if the customer decides to change his service provider from a first service provider to a second service provider, the second service provider may replace the old NID 110, with a new NID 110, that may be more appropriate to the communication network provided by the service provider, without relying on the presence of the customer at the customer premises. For example, if the customer decides to change from a service provider offering a DSL network to a service provider offering a cable network, for example a coax network, and the NID 110 comprises a DSL modem, embodiments of the invention allow the DSL modem to be replaced with a cable modem, or another suitable device, with relative ease. Although this aspect of the invention may occur in the embodiment depicted in FIG. 14, other embodiments as described previously may have the NID 110 internal to the customer premises or integrated with other components, such as the NIC 520, and therefore this aspect of the invention is not essential to the present invention.

While the invention has been described within the example of FIG. 14 with specific reference to the DSL network 1405, the WiFi Network 1420, and the cable network 1425, the invention may equally apply to any combination of communications networks and local networks. For example either network may comprise a wireless network, such as a WiFi network, or a WiMax network and/or a wired network, such as a DSL network, a cable network, a DSL network, a fibre network, and/or an Ethernet network.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

The invention claimed:

1. A network interface controller comprising:
   an interface configured to communicate with a network interface device, the network interface device for enabling communication between a communications network and at least one customer device, and
   a processing module in communication with the interface, the processing module configured to determine a condition of the network interface device, to generate a trigger responsive to the condition of the network interface device qualifying as a reset condition; and to release the trigger to a power controller to cause cycling of power to the network interface device.

2. The network interface controller of claim 1, wherein the interface is further configured to convey data between the communications network and the at least one customer device.

3. The network interface controller of claim 1, wherein the processing module is further configured to access data being exchanged between the network interface device and the at least one customer device.

4. The network interface controller of claim 3, wherein the processing module is configured to determine the condition of the network interface device by processing said data.

5. The network interface controller of claim 4, wherein the condition of the network interface device qualifies as a reset condition when said data contains one or more predetermined errors.

6. The network interface controller of claim 5, wherein the one or more predetermined errors comprises the network interface device failing to transmit said data within a predetermined time period.

7. The network interface controller of claim 4, wherein the condition of the network interface device qualifies as a reset condition when an error rate of said data is above a threshold error rate.

8. The network interface controller of claim 1, wherein the processing module is further configured to effect the transmission of a data request to the network interface device via the interface, and wherein the condition of the network interface qualifies as a reset condition if a failure to receive a data request response in response to the data request is detected.

9. The network interface controller of claim 1, wherein the processing module is further configured to effect the transmission of a data request to the network interface device via the interface, and wherein to determine the condition of the network interface device the processing module is further configured to process a data request response received in response to the data request.

10. The network interface controller of claim 9, wherein the condition of the network interface device qualifies as a reset condition if the received data request response indicates that the network interface device requires resetting.

11. The network interface controller of claim 1, wherein to determine the condition of the network interface device the processing module is configured to measure a data exchange rate between the network interface device and the at least one customer device and to determine the condition of the network interface device based on the data exchange rate.

12. The network interface controller of claim 11, wherein the condition of the network interface device qualifies as a reset condition if the data exchange rate is lower than a predetermined threshold data exchange rate.

13. The network interface controller of claim 1, wherein to determine the condition of the network interface device the processing module is configured to determine the condition of the network interface device periodically.

14. The network interface controller of claim 1, wherein the condition of the network interface device qualifies as a reset condition when the current time corresponds to a preset time.

15. The network interface controller of claim 1, wherein the condition of the network interface device qualifies as a reset condition when a predetermined time period has elapsed since the network interface device was last reset.

16. An apparatus comprising:
the network interface controller of claim 1; and
said power controller, said power controller configured to effect said cycling of power to the network interface device, in response to receipt of said trigger from said processing module.

17. The apparatus of claim 16, further comprising a power supply configured to supply said power.

18. The apparatus of claim 16, wherein to effect said cycling of power, the power controller is further configured to switch off power supplied to the network interface device and subsequently switch on power supplied to the network interface device.

19. The apparatus of claim 18, wherein the power controller is further configured to delay the switch on of power supplied to the network interface device for a defined time period.

20. The apparatus of claim 19, wherein the defined time period is configurable by a user.

21. The apparatus of claim 16, wherein to effect said cycling of power, the power controller is configured to switch off power supplied to at least one component of the network interface device and subsequently switch on power supplied to the at least one component of the network interface device.

22. The apparatus of claim 21, wherein the at least one component of the network interface device comprises at least one of a memory component, a logic processing component and a communications component.

23. The network interface controller of claim 1, wherein the interface comprises a portion implemented as at least one of a wireless interface and a wired interface, wherein said wireless interface includes at least one of a WiFi interface and a WiMax interface, and wherein said wired interface includes at least one of a cable interface, a coaxial interface, a power line control interface, an Ethernet interface and a DSL interface.

24. The network interface controller of claim 1, wherein the interface is further configured to communicate with the power controller and wherein the processing module is further configured to release the trigger to the power controller via the interface.

25. The network interface of claim 1, wherein the interface is further configured to provide power to the network interface device from a power supply.

26. A method for controlling a network interface device that enables communication between a communications network and at least one customer device, the method comprising:
determining a condition of the network interface device;
generating a trigger responsive to determining that the condition of the network interface device qualifies as a reset condition; and
releasing the trigger to a power controller, the trigger having an ability to cause the power controller to cycle power to the network interface device.

27. The method of claim 26, further comprising at the power controller:
receiving the trigger; and
cycling the power supplied to the network interface device in response to receiving the trigger.

28. The method of claim 26, wherein determining a condition of the network interface device comprises processing data being exchanged between the network interface device and the at least one customer device.

29. The method of claim 28, wherein the condition of the network interface device qualifies as a reset condition when said data contains one or more predetermined errors.

30. The method of claim 29, wherein the one or more predetermined errors comprises the network interface device failing to transmit said data within a pre-determined time period.

31. The method of claim 28, wherein the condition of the network interface device qualifies as a reset condition when an error rate of said data is above a threshold error rate.

32. The method of claim 26, wherein determining that the condition of the network interface device qualifies as a reset condition comprises transmitting a data request to the network interface device and detecting a failure to receive a response to the transmitting of the data request to the network interface device.

33. The method of claim 26, wherein determining a condition of the network interface device comprises transmitting a data request to the network interface device, receiving a data request response in response to the transmitting of a data request and processing the data request response.

34. The method of claim 33, wherein the condition of the network interface device qualifies as a reset condition when the data request response indicates that the network interface device requires resetting.

35. The method of claim 26, wherein determining a condition of the network interface device comprises receiving a data request response and processing the data request response 36. The method of claim 26, wherein determining a condition of the network interface device comprises measuring a data exchange rate between the network interface device and the least one customer device.

37. The method of claim 36, wherein the condition of the network interface device qualifies as a reset condition if the data exchange rate is lower than a predetermined threshold data exchange rate.

38. The method of claim 26, wherein determining a condition of the network interface device comprises determining the condition of the network interface device periodically.

39. The method of claim 26, wherein the condition of the network interface device qualifies as a reset condition when the current time corresponds to a preset time.

40. The method of claim 26, wherein the condition of the network interface device qualifies as a reset condition when a predetermined time period has elapsed since the network interface device was last reset.

41. The method of claim 27, wherein cycling power supplied to the network interface device comprises switching off power supplied to the network interface device and subsequently switching on power supplied to the network interface device.

42. The method of claim 41, wherein the switching on power supplied to the network interface device is delayed by a defined time period subsequent to the switching off power supplied to the network interface device.

43. The method of claim 27, wherein cycling power supplied to the network interface device comprises switching off power supplied to at least one component of the network interface device and subsequently switching on power supplied to the at least one component of the network interface device.

44. The method of claim 43, wherein the switching on power supplied to the network interface device is delayed by a defined time period subsequent to the switching off power supplied to the network interface device.

45. The method of claim 43, wherein the at least one component of the network interface device comprises at least one of a memory component, a logic processing component and a communications component.

46. A system comprising:
an interface configured to communicate with a network interface device, the network interface device for enabling communication between a communications network and at least one customer device, and
a processing module in communication with the interface, the processing module configured to determine a condition of the network interface device, the processing module further configured to generate a trigger responsive to the condition of the network interface device qualifying as a reset condition; and
a power controller in communication with the processing module, the power controller configured to cycle power supplied to the network interface device, in response to the trigger.

47. The system of claim 46, further comprising a network interface controller, said network interface controller comprising said interface and said processing module.

48. The system of claim 47, wherein the power controller is integrated into the network interface controller.

49. The system of claim 47, wherein the network interface controller is integrated into the network interface device.

50. The system of claim 46, further comprising a power supply, the power supply configured to supply said power.

51. The system of claim 47, further comprising a power supply, the power supply configured to supply said power, wherein in the power controller and the power supply are integrated into the network interface controller.

52. The system of claim 46, wherein the power controller is integrated into the network interface device.

53. The system of claim 47, wherein the power controller and the network interface controller are integrated into the network interface device.

54. The system of claim 47 wherein the network interface controller is integrated into the at least one customer device.

55. A power controller for controlling power to a network interface device, the power controller configured to initiate cycling of power to the network interface device in response to receiving a trigger generated in response to a condition of the network interface device qualifying as a reset condition.

56. A system comprising the power controller of claim 55 and a processing module, the processing module configured to determine a condition of the network interface device, the processing module further configured to generate a trigger responsive to the condition of the network interface device qualifies as a reset condition.

57. The system of claim 56, wherein the condition of the network interface device qualifies as a reset condition when the current time corresponds to a preset time.

58. The system of claim 56, wherein the condition of the network interface device qualifies as a reset condition when a predetermined time period has elapsed since the network interface device was last reset.

* * * * *